# 2,993,066
METHOD OF PREPARING OXO ESTERS OF PHOSPHORUS ACIDS

James L. Dever and Gail H. Birum, Dayton, Ohio, assignors to Monsanto Chemical Company, St. Louis, Mo., a corporation of Delaware
No Drawing. Filed May 8, 1959, Ser. No. 811,790
19 Claims. (Cl. 260—461)

This invention relates to organic phosphorus compounds and more particularly provides a new and valuable method of preparing oxo esters of pentavalent phosphorus acids.

According to our copending application Serial No. 765,696, filed September 26, 1958, oxo esters are prepared by treating a 1:1 trivalent phosphorus ester—alkanedione adduct with a hydrogen donor; thus

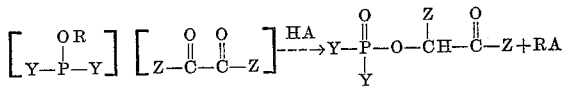

in which R is an alkyl radical of from 1 to 12 carbon atoms, Y is selected from the class consisting of —OR and hydrocarbon radicals free of aliphatic unsaturation and containing from 1 to 12 carbon atoms, and each Z is an alkyl radical of from 1 to 8 carbon atoms, and HA denotes a hydrogen donor. The phosphorus containing component of the adduct in the above equation was a completely esterified trivalent phosphorus acid, e.g., a trialkyl phosphite, a dialkyl hydrocarbylphosphonite, or an alkyl dihydrocarbylphosphinite. Preparation of the oxo ester according to the above scheme always involved the formation of the by-product RA, e.g., ethanol when the phosphorus ester was an ethyl ester and the hydrogen donor was water.

Now we have found that the same oxo esters can be prepared by a process wherein no by-products are formed, which proceeds readily, and which gives products of good purity. According to the invention, the oxo esters are prepared not from the completely esterified trivalent phosphorus esters, but from the comparatively low cost pentavalent phosphorus esters substantially according to the scheme:

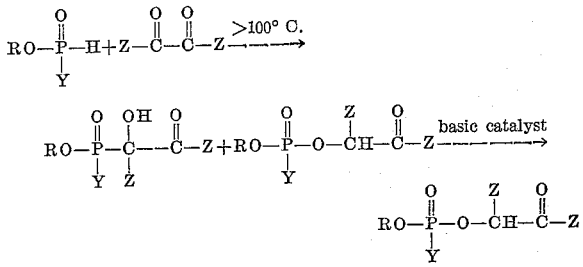

wherein R is selected from the class consisting of radicals which have 1 to 12 carbon atoms and are free of aliphatic unsaturation and Y is selected from the class consisting of R and —OR, and Z is an alkyl radical of from 1 to 8 carbon atoms.

As can be seen from the above, the reaction proceeds by intermediate formation of a mixture of hydroxy oxo ester and an oxo phosphate or an oxo phosphonate, and subsequent rearrangement of the hydroxy constituent of the mixture to additional oxo phosphate or oxo phosphonate with the final product consisting essentially of the hydroxy-free compound.

Reaction of 2,3-butanedione and dialkyl phosphonates in a sealed ampul on a water bath has been reported by Abramov et al., Trudy Kazan. Khim. Tekhnol. Inst. im. S. M. Kirova, 23, 96-8 (1957), Chemical Abstracts, 52,8941 (1958), to give dialkyl α-hydroxy-α-acyl phosphonates, according to the scheme:

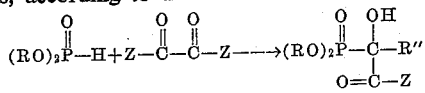

We have found, however, that when heating is conducted at a temperature of over 100° C. and below 200° C., the product is a mixture of (I)
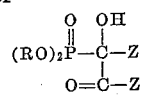

and (II)
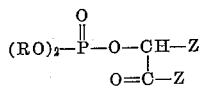

We have found that when said mixtures are treated with a catalytic quantity of a basic catalyst at ordinary or moderately decreased or increased temperatures, the hydroxy compounds (I) are very readily isomerized to the hydroxy-free compounds (II).

The present invention thus provides the method of preparing the oxo phosphates or oxo phosphonates by starting with the alkanedione and the pentavalent phosphorus ester and rearranging the hydroxy oxo ester content of the resulting reaction product. The invention also provides the method of preparing the oxo phosphates or phosphonates from the hydroxy oxo esters.

Pentavalent phosphorus esters useful for the present purpose are either dibasic phosphonates, i.e., compounds of the formula

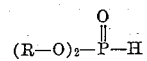

where R is an alkyl or haloalkyl radical having from 1 to 12 carbon atoms; or monobasic hydrocarbylphosphinates, i.e., compounds of the formula

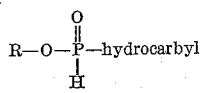

wherein R is as above defined and the hydrocarbyl radical is free of aliphatic unsaturation and contains from 1 to 12 carbon atoms.

Dibasic phosphonates useful for the present purpose are the simple dihydrocarbyl phosphonates such as dimethyl, diethyl, diisopropyl, di-n-propyl, di-n-butyl, dibenzyl, diisobutyl, di-n-amyl, di-n-hexyl, di-n-heptyl, di-p-tolyl, di-n-octyl, diphenyl, bis(2-ethylhexyl), dicyclohexyl, di-tert-nonyl, di-n-decyl, bis(2-phenylethyl), di-undecyl, di-β-naphthyl, di-n-dodecyl, bis(4-ethylphenyl), di-tert-dodecyl, and bis(2-butyloctyl) phosphonate; the mixed dihydrocarbyl phosphonates such as methyl n-propyl, n-amyl phenyl, benzyl ethyl, n-dodecyl isopropyl, 2-ethylhexyl o-tolyl and cyclopentyl methyl phosphonate; the simple halohydrocarbyl phosphonates such as bis(2-chloroethyl), bis(2-iodophenyl), bis(2-fluoroethyl), bis(2,4-dichlorophenyl), bis(dichlorooctyl), bis(4-iodocyclohexyl), bis(4-chlorobenzyl), bis(2-bromo-2-chloroethyl) and bis(trichlorododecyl) phosphonate; the mixed halohydrocarbyl phosphonates such as 2-chloroethyl 3-chlorophenyl phosphonate, 3,3-difluoropropyl tetrachlorobenzyl phosphonate, 2-chloroethyl p-tolyl phosphonate or ethyl 3-fluoropropyl phosphonate.

Presently useful hydrocarbylphosphinates include, e.g., methyl phenylphosphinate, ethyl α-naphthylphosphinate, n-propyl methylphosphinate, n-butyl benzylphosphinate, n-amyl p-tolylphosphinate, isopropyl cyclohexylphosphinate, 2-ethylhexyl, 2,4-diethylphenylphosphinate, phenyl n-hexylphosphinate, 2-butyloctyl n-propylphosphinate, cyclohexyl p-biphenylphosphinate, undecyl n- hexylphosphinate, n-hexyl 2-methylcyclopentylphosphinate, ethyl 4-n-hexylphenylphosphinate, benzyl 2-phenylethylphosphinate, n-dodecyl 2-ethylhexylphosphinate, 2-chloroethyl phenylphosphinate, tetrachloropentyl ethylphosphinate, 3-bromopropyl n-hexylphosphinate, dibromododecyl methylphosphinate, 2-iodoethyl benzylphosphinate, trichlorooctyl cyclohexylphosphinate, 4-fluorobutyl α-naphthylphosphinate, 4- chlorophenyl ethylphosphinate, 2,5-dichlorocyclohexyl phenylphosphinate, 2-chlorobenzyl n-butylphosphinate, etc.

The alkyl radical of either a dialkyl, alkyl aryl or alkyl halohydrocarbyl phosphonates or the alkyl hydrocarbylphosphinates may also be one derived from a branched chain alcohol obtained according to the "Oxo" process by the reaction of carbon monoxide and hydrogen with a higher olefin, e.g., butylene dimer or propylene trimer.

Diones which react with above phosphonates or phosphinates are α-alkanediones of from 4 to 18 carbon atoms, e.g., 2,3-butanedione, 2,3-pentanedione, 3,4-hexanedione, 2,3-hexanedione, 4,5-octanedione, 3,4-heptanedione, 2,3-nonanedione, 4-methyl-2,3-pentanedione, 5,6-decanedione, 3,4-undecanedione, 5,6-dodecanedione, 6,7-tridecanedione, 6,7-tetradecanedione, 5,6-pentadecanedione, 7,8-hexadecanedione, 6,7-heptadecanedione, 8,9-octadecanedione.

Reaction of a dibasic phosphonate with the alkanedione at a temperature of from 100° C. to 200° C. and subsequent treatment of the resulting product with a basic catalyst results in the production of the substantially pure oxo phosphate of the formula

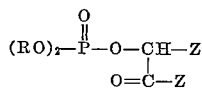

in which R is an alkyl or haloalkyl radical of from 1 to 12 carbon atoms and Z is an alkyl radical of from 1 to 8 carbon atoms. Employing a monobasic hydrocarbyl phosphinate, instead of the dibasic phosphonate, the reaction gives the substantially pure oxo hydrocarbylphosphonate

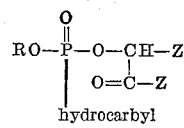
hydrocarbyl where R and Z are as above defined and the hydrocarbyl radical is free of aliphatic unsaturation and contains from 1 to 12 carbon atoms.

Thus, starting from the dibasic phosphonates and the alkanediones shown below there are obtained according to the present process the following oxo phosphates:

| Phosphonate | Alkanedione | Phosphate |
|---|---|---|
| dimethyl | 2,3-butanedione | dimethyl 1-methyl-2-oxopropyl. |
| bis(2-chloroethyl) | 3,4-hexanedione | bis(2-chloroethyl) 1-ethyl-2-oxobutyl. |
| diphenyl | 4,5-octanedione | diphenyl 1-propyl-2-oxopentyl. |
| dihexyl | 5,6-decanedione | dihexyl 1-butyl-2-oxohexyl. |
| bis(2-ethylhexyl) | 2,7-dimethyl-4,5-octanedione. | bis(2-ethylhexyl) 1-sec-butyl-4-methyl-2-oxopentyl. |
| dibenzyl | 2,3-butanedione | dibenzyl 1-methyl-2-oxopropyl. |
| didodecyl | do | didodecyl 1-methyl-2-oxopropyl. |
| diisopropyl | 2,3-undecanedione | diisopropyl 1-methyl-2-oxodecyl and diisopropyl 1-octyl-2-oxopropyl. |
| dibutyl | 2,3-pentanedione | dibutyl 1-ethyl-2-oxopropyl and dibutyl 1-methyl-2-oxobutyl. |
| diethyl | 3,4-hexanedione | diethyl 1-ethyl-2-oxobutyl. |
| bis(2-fluoroethyl) | 7,8-tetradecanedione. | bis(2-fluoroethyl) 1-hexyl-2-oxooctyl. |
| bis(trichlorobutyl) | 9,10-octadecanedione. | bis(trichlorobutyl) 1-octyl-2-oxodecyl. |
| 2-bromopropylethyl | 6,7-dodecadione | 2-bromopropyl ethyl 1-pentyl 2-oxoheptyl. |
| bis(2-chlorophenyl) | 4,5-octanedione | bis(2-chlorophenyl) 1-propyl-2-oxopentyl. |
| butyl methyl | 2,3-pentanedione | butyl methyl 1-ethyl 2-oxopropyl and butyl methyl 1-methyl 2-oxobutyl. |
| 2-iodocyclohexyl ethyl. | 5,6-decanedione | 2-iodocyclohexyl ethyl 1-butyl-2-oxohexyl. |

Starting from a hydrocarbylphosphinate and the alkanediones shown below, there are obtained according to the present process the following oxo hydrocarbylphosphonates.

Ethyl 1-methyl-2-oxopropyl butylphosphonate from ethyl butylphosphinate and 2,3-butanedione.

2-chloroethyl 1-butyl-2-oxohexyl phenylphosphonate from 2-chloroethyl phenylphosphinate and 5,6-decanedione.

Dodecyl 1-methyl-2-oxopropyl phenylphosphonate from dodecyl phenylphosphinate and 2,3-butanedione.

Phenyl 1-methyl-2-oxononyl β-naphthylphosphonate and phenyl 1-heptyl-2-oxopropyl β-naphthylphosphonate from phenyl β-naphthylphosphinate and 2,3-decanedione.

3-bromobenzyl 1-methyl-2-oxopropyl cyclohexylphosphonate from 3-bromobenzyl cyclohexylphosphinate and 2,3-butanedione.

Cyclohexyl 1-sec-butyl-4-methyl-2-oxopentyl benzylphosphonate from cyclohexyl benzylphosphinate and 2,7-dimethyl-4,5-octanedione.

2-ethylhexyl 1-propyl-2-oxopentyl p-tolylphosphonate from 2-ethylhexyl p-tolyphosphinate and 4,5-octanedione.

It will be noted that when an unsymmetrical diketone is employed, the product is a mixture of products wherein in addition has taken place at dissimilar carbonyl groups. Thus, 2,3-pentanedione and the pentavalent phosphorus ester react as follows.

$$RO-\overset{O}{\underset{Y}{P}}-H + CH_3\overset{O}{C}-\overset{O}{C}-CH_2CH_3 \xrightarrow{heat} \begin{bmatrix}\text{Mixture of}\\ \text{hydroxy oxo}\\ \text{and hydroxy-}\\ \text{free oxo}\\ \text{esters}\end{bmatrix} \xrightarrow{base}$$

$$RO-\overset{O}{\underset{Y}{P}}-O-CH-\overset{O}{C}-CH_2CH_3 + RO-\overset{O}{\underset{Y}{P}}-OCH-\overset{O}{C}-CH_3$$
$$\phantom{RO-\overset{O}{\underset{Y}{P}}-O-}CH_3 \phantom{xxxxxxxxxxxxxxxx} CH_2CH_3$$

Reaction of the above-described diketones and the phosphorous esters for preparation of the mixture of hydroxy and oxo esters is generally effected by simply heating a mixture of the two reactants at a temperature of from 100° C. to 200° C., and preferably at a temperature of from 110° C. to 180° C. until reaction has taken place. This can be readily gauged by noting change in viscosity of the reaction mixture, cessation of change in refractive index, cessation of reflux, etc. While the heating time will vary with the nature of the individual reactants and quantities thereof as well as with the temperature employed, generally heating for, say, a few minutes to a few hours suffices to convert the mixture of phosphonate or phosphinate and diketone into a mixture of oxo hydroxy compound and the hydroxy-free oxo compound. Within the 100–200° C. temperature range, the higher temperatures favor a predominance of the latter. The quantity of the hydroxy-free oxo compound also increases with increasing heating time. Thus, it has been found that by heating for several hours the mixture originally obtained from diethyl phosphonate and 2,3-butane-dione and checking the relative concentrations of (I) the hydroxy oxo compound and (II) the hydroxy-free oxo compound at intervals by nuclear magnetic resonance area measurements, the ratio of (I) to (II) changed from 52:48 to 30:70 during 5 hours at 140° C.

Since formation of the mixture of hydroxy oxo ester and hydroxy-free oxo ester involves reaction of a molar equivalent of the diketone with a molar equivalent of the pentavalent phosphorus ester, the two reactants are advantageously employed in the stoichiometric proportions. However, since an excess of either reactant may be readily separated from the product, e.g., by distillation, the ketone and the ester reactant may be used in any proportion. The reaction may be conducted in the presence or absence of extraneous, inert diluents or solvents. As will be appreciated by those skilled in the art the useful solvent or diluent will have a boiling point which is within the 100–200° C. operating temperature range, e.g., xylene, tetrahydronaphthalene, or dichlorobenzene.

Conversion of the mixture of (I) 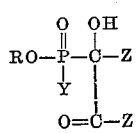

and (II) 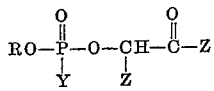

entirely to (II) takes place by simply contacting said mixture with a basic catalyst which is selected from the class consisting of inorganic alkalies and alkali metal alcoholates. Rearrangement of the (I) content of the mixture takes place so readily that heating is generally unnecessary. As a matter of fact, when using very basic materials, e.g., metallic sodium or metallic potassium, the rearrangement is smoothly effected by working at ordinary room temperature or even preferably with external cooling, for the reaction is generally somewhat exothermic. With the highly basic catalysts it is likewise advantageous to operate in the presence of an inert diluent or solvent, e.g., benzene, toluene, or xylene.

Presently useful catalysts for the rearrangement are basic agents selected from the class consisting of the alkali metals and the hydrides, oxides, hydroxides and alcoholates thereof, e.g., metallic sodium, potassium or lithium; sodium, potassium or lithium hydroxide; sodium, potassium or lithium oxide; sodium, potassium or lithium hydride; sodium methoxide, potassium butoxide, lithium ethoxide, potassium isopropoxide, sodium pentoxide, lithium methoxide, etc.

Since it is employed only as a catalyst for the rearrangement reaction, the basic agent is used in only small quantities, e.g., in amounts which are, say, from 0.001% to 1.0% by weight of the mixture of hydroxy oxo ester and hydroxy-free oxo ester. The rearrangement generally occurs very readily. For smooth reaction it is therefore recommended that the catalyst, particularly if it is strongly basic, be introduced gradually into the mixture which is treated; employing dropwise addition of a catalyst suspension or solution, the rearrangement is usually complete by the time that, say, a 0.5% to 1.0% suspension or solution of the catalyst has been introduced. However, because the ease of rearrangement varies with the nature of the reaction mixture as well as with the basicity and quantity of catalyst employed, it is suggested that for each initially employed mixture there be employed first a minimum of catalyst, say, from 0.001% to 0.01% by weight and that the quantity be increased gradually until reaction is evidenced.

The substantially pure oxo phosphate or oxo hydrocarbylphosphonate is readily separated from the catalyst and solvent, if any, by conventional isolating procedures, e.g., by filtration, distillation, solvent extraction, etc. For many purposes, however, e.g., when the oxo ester is to be used as a biological toxicant, the crude reaction mixture may be used directly.

Solvents or diluents for the basic catalysts which are useful in the rearrangement reaction are liquids which are inert under the reaction conditions, e.g., benzene, toluene, methylene chloride or hexane. When the catalyst is an alcoholate, a convenient diluent is the corresponding alcohol; e.g., the alcoholate may be prepared by addition of the alkali metal to an excess of an alcohol, and the resulting alcoholic solution of the alcoholate, say, a solution of sodium butoxide in butanol is used for the rearrangement reaction.

As disclosed in our copending application Serial No. 765,696, filed September 26, 1958, of which this application is a continuation-in-part, there may be used only the substantially pure hydroxy oxo ester in the rearrangement step. The reaction thus proceeds as follows in the case of the hydroxy oxo phosphonate:

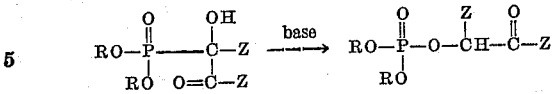

with the hydroxy oxo hydrocarbyl or halohydrocarbyl phosphinate it takes place according to the same mechanism:

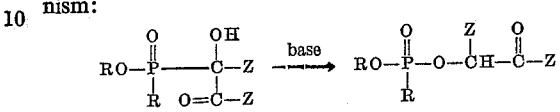

wherein R is a hydrocarbon or a halohydrocarbon radical which is free of aliphatic unsaturation and contains from 1 to 12 carbon atoms and Z is an alkyl radical of from 1 to 8 carbon atoms.

In practical operation, the two-step process, i.e., preparation of the mixture of hydroxy oxo ester and the hydroxy-free oxo ester and subsequent rearrangement of the hydroxy ester content of the mixture, proceeds with remarkable ease and leads to very good over-all conversion of the starting diketone and phosphonate or phosphinate into the hydroxy-free oxo-ester. The two-step process, of course, dispenses with the necessity for isolating the hydroxy oxo ester previous to the rearrangement step.

The oxo phosphates or oxo hydrocarbyl phosphonates prepared according to the present process are useful for a variety of commercial and agricultural purposes, e.g., as additives to hydrocarbon fuels and lubricants, as flameproofing agents for textiles and for synthetic resins and plastics, and as herbicides having selective action.

The invention is further illustrated by, but not limited to, the following examples:

*Example 1*

2,3-butanedione (86.1 g., 1.0 mole) and 137.1 g. (1.0 mole) of diethyl phosphonate were charged into a flask equipped with a stirrer, thermometer, and condenser with drying tube. This solution was heated to 140° C. and maintained there for 5 hours. Distillation gave a small amount of forerun and then 188 g. (84% yield) of pale yellow liquid, B.P. 92–96° C. (0.1 to 0.2 mm.), $n_D^{25}$ 1.4339. NMR area measurements showed the product to be about 77% diethyl 1-hydroxy-1-methyl-2-oxopropylphosphonate and 23% diethyl 1-methyl-2-oxopropyl phosphate.

A 44.9 g. portion of the above mixture was added to 75 ml. of benzene containing 0.5 g. of sodium shavings. An exothermic reaction occurred and the temperature was kept below 30° C. by cooling with an ice bath. When no further reaction was evident, the excess sodium was removed and the benzene stripped off at the water pump. Distillation gave a small forerun and then 31.2 g. (70% yield) of clear, colorless liquid, B.P. 88–90° C. (0.2 mm.), $n_D^{25}$ 1.4200. NMR and infrared spectra indicated the product to be pure diethyl 1-methyl-2-oxopropyl phosphate, which analyzed as follows:

|  | Found | Calcd. for $C_8H_{17}O_5P$ |
|---|---|---|
| Percent C | 42.92 | 42.88 |
| Percent H | 7.83 | 7.63 |
| Percent P | 13.83 | 13.81 |

Rearrangement of the mixture of diethyl 1-hydroxy-1-methyl-2-oxopropylphosphonate and the diethyl 1-methyl-2-oxopropyl phosphate to the substantially pure phosphate was also effected by employing sodium hydride in place of metallic sodium but otherwise following the same procedure. NMR and infrared spectra show the product to be identical to that obtained with sodium.

The rearrangement was also effected by means of sodium ethoxide. A dilute solution of sodium ethoxide, prepared from 0.2 g. of sodium in 30 ml. of absolute ethanol, was added dropwise to 44.9 g. of the mixture of diethyl 1-hydroxy-1-methyl-2-oxo-propylphosphonate and diethyl 1-methyl-2-oxopropyl phosphate herein prepared. After 10 ml. of this solution has been added the temperature increased rapidly, and cooling was applied to keep the temperature below 40° C. After removal of the ethanol, distillation gave the substantially pure diethyl 1-methyl-2-oxopropyl phosphate.

*Example 2*

This example shows the effect of heating on a reaction mixture obtained from a diketone and a dialkyl phosphonate.

2,3-butanedione (57.6 g., 0.67 mole) and 92.1 g. (0.67 mole) of diethyl phosphonate were charged into a flask equipped with a stirrer, thermometer and condenser. When this solution was heated, it refluxed at 115° C. for 0.6 hour. The temperature then increased to 165° C. in two hours where it was maintained for 0.5 hour. Distillation gave 9.0 g. of unreacted phosphonate, 114.4 of pale yellow product, B.P. 86–90° C. (0.1 mm.), $n_D^{25}$ 1.4293. The yield of a mixture of diethyl 1-hydroxy-1-methyl-2-oxopropylphosphonate and diethyl 1-methyl-2-oxopropyl phosphate was 85%.

A flask equipped with a reflux condenser, thermometer, and stirrer was charged with 102 g. of the above product. It was heated at 140° C., and samples removed at regular intervals. The results are tabulated below:

| Sample No. | Time Elapsed (Hrs.) | $n_D^{25}$ | Percent Phosphate |
|---|---|---|---|
| 1 | 1 0 | 1.4293 | 48 |
| 2 | 1 | 1.4282 | 52 |
| 3 | 2 | 1.4272 | 55 |
| 4 | 3 | 1.4264 | 60 |
| 5 | 4 | 1.4260 | 63 |
| 6 | 5 | 1.4254 | 70 |

1 Starting material.

*Example 3*

To 0.5 g. of elemental sodium in 75 ml. of dry benzene, there was added, dropwise during about 10 minutes, 44.9 g. of diethyl 1-hydroxy-1-methyl-2-oxopropylphosphonate. Addition of the phosphonate was initiated at a temperature of 25° C., but because the temperature soon rose to 35° C., cooling was applied intermittently to maintain the reaction temperature at below 30° C. When all of the phosphonate had been added, the whole was heated to 50° C., cooled and filtered and the filtrate distilled to give the diethyl 1-methyl-2-oxopropyl phosphate, B.P. 88–90° C./0.15–0.2 mm.

*Example 4*

This example shows reaction of a diketone with a dialkyl phosphonate employing a comparatively short heating period to obtain a mixture of the hydroxyphosphonate and phosphate and subsequent conversion of said mixture to the substantially pure phosphate.

2,3-butanedione (34.4 g., .04 mole), and 77.7 g. (0.4 mole) of dibutyl phosphonate were charged into a flask equipped with a stirrer, thermometer, and condenser and this solution was then heated to reflux (106° C.). Heating was continued until the temperature had reached 165° C. and no further 2,3-butanedione could be observed refluxing. This required 35 minutes. Distillation gave a small amount of forerun and then 78.7 g. (70% yield) of a pale yellow liquid, B.P. 140–146° C. (0.8 to 1.3 mm.), $n_D^{25}$ 1.4328. NMR area measurements showed the product to be about 58% dibutyl 1-hydroxy-1-methyl-2-oxopropylphosphonate and 42% dibutyl 1-methyl-2-oxopropyl phosphate which analyzed as follows:

| | Found | Calcd. for $C_{12}H_{25}O_5P$ |
|---|---|---|
| Percent C | 51.17 | 51.47 |
| Percent H | 9.22 | 8.98 |
| Percent P | 11.40 | 11.02 |

Conversion of the above mixture of hydroxyphosphonate and phosphate to the substantially pure phosphate was effected by adding 56.1 g. of said mixture to 75 ml. of dry benzene containing 0.3 g. of sodium shavings. An exothermic reaction occurred which required cooling to keep the temperature below 30° C. When no further reaction was evident, excess benzene was removed by the water pump. Distillation gave a small forerun and then the clear, colorless liquid, B.P.121–123° C. (0.01 mm.), $n_D^{25}$ 1.4267. NMR and infrared indicated the product was pure dibutyl 1-methyl-2-oxopropyl phosphate, which analyzed as follows:

| | Found | Calcd. for $C_{12}H_{25}O_5P$ |
|---|---|---|
| Percent C | 51.07 | 51.47 |
| Percent H | 9.19 | 8.98 |
| Percent P | 11.14 | 11.02 |

*Example 5*

2,3-butanedione (21.6 g., 0.25 mole) and 76.6 g. (0.25 mole) of bis(2-ethylhexyl) phosphonate were charged into a flask equipped with a thermometer, stirrer and condenser. The resulting mixture was heated to reflux (107° C.), and heating was continued until the temperature reached 165° C. It was then held at 140° C. for one hour. Distillation gave a small amount of distillable material and 86.5 g. (88% yield) of clear, yellow residue, $n_D^{25}$ 1.4482 (max. pot temp. 153° C./0.06 mm.). NMR area measurements showed the product to be 80% bis (2-ethylhexyl) 1-hydroxy-1-methyl-2-oxopropylphosphonate and 20% bis(2-ethylhexyl) 1-methyl-2-oxopropyl phosphate, which analyzed as follows:

| | Found | Calcd. for $C_{20}H_{41}O_5P$ |
|---|---|---|
| Percent C | 62.00 | 61.22 |
| Percent H | 10.48 | 10.49 |
| Percent P | 7.59 | 7.89 |

Treatment of 18.2 g. of the above mixture of hydroxyphosphonate and phosphate with 0.05 g. of sodium hydride in 25 ml. of dry benzene resulted in an exothermic reaction. After filtration, the product was concentrated to 90° C. (0.05 mm.) to remove the solvent. The weight of product obtained was 16 g. (88% yield), $n_D^{25}$ 1.4429. NMR and infrared spectra showed the product to be the substantially pure bis(2-ethylhexyl) 1-methyl-2-oxopropyl phosphate. It analyzed as follows:

| | Found | Calcd. for $C_{20}H_{41}O_5P$ |
|---|---|---|
| Percent C | 61.14 | 61.22 |
| Percent H | 10.35 | 10.49 |
| Percent P | 7.80 | 7.89 |

*Example 6*

Diethyl phosphonate (55.2 g., 0.4 mole) and 39.6 g. (0.4 mole) of 2,3-pentanedione were charged into a flask equipped with a stirrer, thermometer, and condenser. This solution was then heater at reflux. The temperature increased from 123° C. to 163° C. in one-half hour. Distillation gave a small amount of forerun and 55.5 g. (77% yield) of pale yellow product, B.P. 108–112° C. (0.25 to 0.35 mm.), $n_D^{25}$ 1.4404. NMR area measurements showed the product to be about 90% of a mixture of diethyl 1-hydroxy-1-methyl-2-oxobutylphosphonate and diethyl 1-hydroxy-1-ethyl-2-oxopropylphosphonate and 10% of a mixture of diethyl 1methyl-2-oxobutyl phosphate and 1-ethyl-2-oxopropyl phosphate, which analyzed as follows:

|  | Found | Calcd. for $C_9H_{19}O_5P$ |
| --- | --- | --- |
| Percent C | 45.61 | 45.54 |
| Percent H | 7.72 | 8.03 |
| Percent P | 12.95 | 12.98 |

Treatment of the above product, 7.2 g. (0.032 mole), with about 0.05 g. of sodium hydride in 15 ml. of dry benzene resulted in an exothermic reaction. After removal of the solvent, distillation gave a small amount of forerun and then 5 g. (70%) of product, B.P. 90–91° C. (0.05 mm.), $n_D^{25}$ 1.4229. NMR indicated that the product contained only phosphate, i.e., a mixture of diethyl 1-methyl-2-oxobutyl phosphate and diethyl 1-ethyl-2-oxopropyl phosphate which analyzed as follows:

|  | Found | Calcd. for $C_9H_{19}O_5P$ |
| --- | --- | --- |
| Percent C | 45.54 | 45.54 |
| Percent H | 7.91 | 8.03 |
| Percent P | 13.15 | 12.98 |

Example 7

A mixture consisting of 78.1 g. (0.33 mole) of diphenyl phosphonate and 28.7 g. (0.33 mole) of 2,3-butanedione was heated to reflux (104° C.) and heating was continued for 15 minutes, at the end of which time the temperature of the reaction mixture had reached 180° C. The whole was then allowed to cool and material boiling below 58° C./0.4 mm. was removed. There was thus recovered 1.5 g. of unreacted dione. There was thus obtained as residue 93.9 g. of product consisting of a major amount of diphenyl 1-hydroxy-1-methyl-2-oxopropylphosphonate and a minor amount of diphenyl 1-methyl-2-oxopropyl phosphate. Rearrangement by treatment with a benzene suspension of sodium shavings gave the substantially pure diphenyl 1-methyl-2-oxopropyl phosphate.

Example 8

A mixture consisting of 25 g. (0.176 mole) of 2,3-octane-dione and 24.3 g. (0.176 mole) of diethyl phosphonate was heated at 150–155° C. for 0.75 hour. The whole was then allowed to cool and subsequently distilled to give 30 g. of a mixture consisting of phosphonate, i.e., diethyl 1-hydroxy-1-methyl-2-oxoheptylphosphonate and diethyl 1-hydroxy-1-pentyl-2-oxopropylphosphonate and phosphate, i.e., a mixture of diethyl 1-methyl-2-oxoheptyl phosphate and diethyl 1-pentyl-2-oxopropyl phosphate, B.P. 131–136° C./0.6 mm. $n_D^{25}$ 1.4372, which analyzed as follows:

|  | Found | Calcd. for $C_{12}H_{25}O_5P$ |
| --- | --- | --- |
| Percent C | 51.30 | 51.48 |
| Percent H | 9.23 | 8.96 |
| Percent P | 11.07 | 11.04 |

The above mixture of oxo phosphate and hydroxy-phosphonate was converted to essentially the oxo phosphate as follows: To a solution consisting of 21.0 g. (0.075 mole) of said mixture in about 75 ml. of benzene there was added approximately 0.2–0.3 g. of sodium metal shavings. Stirring of the mixture caused the temperature thereof to rise from 25° C. to 29° C. The whole was then heated to 70° C. and distilled to give the substantially pure mixture of diethyl 1-methyl-2-oxoheptyl phosphate and diethyl 1-pentyl-2-oxopropyl phosphate, B.P. 142–146° C./1.0–1.3 mm., $n_D^{25}$ 1.4328, which analyzed as follows:

|  | Found | Calcd. for $C_{12}H_{25}O_5P$ |
| --- | --- | --- |
| Percent C | 51.46 | 51.48 |
| Percent H | 9.05 | 8.96 |
| Percent P | 10.81 | 11.04 |

Example 9

Bis(2-chloroethyl) phosphonate (51.8 g., 0.25 mole) was mixed with 21.6 g. (0.25 mole) of 2,3-butanedione. The whole was then heated to reflux (103° C.) and heating continued for 25 minutes, at the end of this time the temperature of the reaction mixture was 153° C. and no refluxing was observed. After heating at 145° C. for another 0.5 hour, the mixture was concentrated to 90°C./0.05 mm. There was thus obtained as residue a mixture of 67.8 g. of the substantially pure bis(2-chloroethyl) 1-hydroxy-1-methyl-2-oxopropyl phosphonate and bis (2-chloroethyl) 1-methyl-2-oxopropyl phosphate. A 44.2 g. fraction of said mixture in an equal volume of benzene was then vigorously stirred with 0.1 to 0.2 g. of sodium shavings and subsequently refluxed for 10 minutes. Cooling to 45° C., removal of the benzene under water-pump vacuum and concentration to 80° C./0.05 mm. gave as residue the substantially pure bis(2-chloroethyl) 1-methyl-2-oxopropyl phosphate.

Example 10

A mixture consisting of 21.8 g. (0.128 mole) of ethyl phenylphosphinate and 11.4 g. (0.132 mole) of 2,3-butanedione was heated to reflux (107° C.) and refluxing was continued for 15 minutes at the end of which time the temperature of the reaction mixture was 140° C. and no further refluxing was observed. Heating at 145° C. was continued for another 40 minutes. The whole was then allowed to cool and then concentrated to 80° C./0.05 mm. There was thus obtained as residue 31.7 g. of a mixture of ethyl 1-hydroxy-1-methyl-2-oxopropyl phenylphosphinate and ethyl 1-methyl-2-oxopropyl phenylphosphonate.

To a solution consisting of 22.0 g. of said mixture in an equal volume of benzene, there was added about 0.1–0.2 g. of sodium metal shavings. Upon stirring the mixture, the temperature thereof rose slowly from 21° C. to 25° C. It was then heated to reflux and maintained at that temperature for 10 minutes. Concentration of the resulting reaction product to 80° C./0.05 mm. gave as residue the substantially pure ethyl 1-methyl-2-oxopropyl phenylphosphonate.

What we claim is:

1. The method which comprises heating, at a temperature of over 100° C. but below 200° C., an alkanedione of the formula

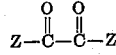

in which Z is an alkyl radical of from 1 to 8 carbon atoms with a pentavelent phosphorus ester of the formula

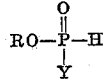

where R is selected from the class consisting of hydrocarbon and halohydrocarbon radicals which have from 1 to 12 carbon atoms and are free of aliphatic unsaturation and Y is selected from the class consisting of R and —OR to obtain a mixture of (I) a hydroxy ester of the formula

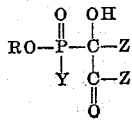

where R, Y, and Z are as herein defined and (II) an ester of the formula

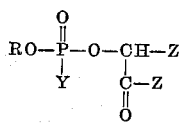

where R, Y and Z are as herein defined and converting the (I) content of said mixture into (II) by contacting the mixture with a basic catalyst selected from the class consisting of the alkali metals and the hydrides, oxides, hydroxides and alcoholates thereof.

2. The method which comprises heating, at a temperature of over 100° C. and below 200° C., an alkanedione of the formula

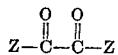

in which C is an alkyl radical of from 1 to 8 carbon atoms with a phosphonate of the formula

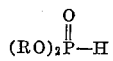

wherein R is a hydrocarbon radical which is free of aliphatic unsaturation and contains from 1 to 12 carbon atoms, to obtain a mixture of a hydroxy oxo phosphonate of the formula

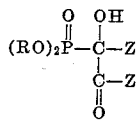

in which R and Z are as herein defined and an oxo phosphate of the formula

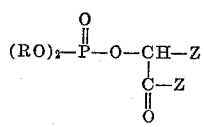

in which R and Z are as defined, and converting said hydroxy oxo phosphonate content of said mixture into said oxo phosphate by contacting the mixture with a basic catalyst consisting essentially of an alkali metal.

3. The method which comprises heating, at a temperature of over 100° C. and below 200° C., an alkanedione of the formula

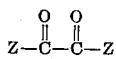

in which Z is an alkyl radical of from 1 to 8 carbon atoms with a phosphonate of the formula

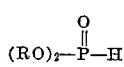

wherein R is a hydrocarbon radical which is free of aliphatic unsaturation and contains from 1 to 12 carbon atoms, to obtain a mixture of a hydroxy oxo phosphonate of the formula

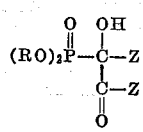

in which R and Z are as herein defined and an oxo phosphate of the formula

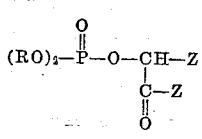

in which R and Z are as defined, and converting said hydroxy oxo phosphonate content of said mixture into said oxo phosphate by contacting the mixture with a basic catalyst consisting essentially of an alkali metal hydride.

4. The method which comprises heating, at a temperature of over 100° C. and below 200° C., an alkanedione of the formula

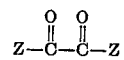

in which Z is an alkyl radical of from 1 to 8 carbon atoms with a phosphonate of the formula

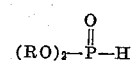

wherein R is a hydrocarbon radical which is free of aliphatic unsaturation and contains from 1 to 12 carbon atoms, to obtain a mixture of a hydroxy oxo phosphonate of the formula

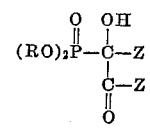

in which R and Z are as herein defined and an oxo phosphate of the formula

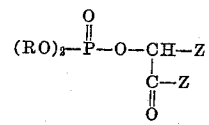

in which R and Z are as defined, and converting said hydroxy oxo phosphonate content of said mixture into said oxo phosphate by contacting the mixture with a basic catalyst consisting essentially of an alkali metal alcoholate.

5. The method which comprises heating, at a temperature of over 100° C. and below 200° C., an alkanedione of the formula

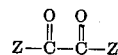

in which Z is an alkyl radical of from 1 to 8 carbon atoms with a phosphinate of the formula

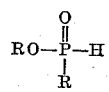

in which R is a hydrocarbon radical which is free of aliphatic unsaturation and contains from 1 to 12 carbon atoms to obtain a mixture of a hydroxy oxo phosphinate of the formula

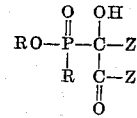

in which R and Z are as herein defined and an oxo phosphonate of the formula

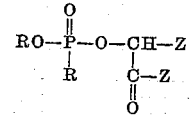

in which R and Z are as herein defined, and converting said hydroxy oxo phosphinate content of said mixture into said oxo phosphonate by contacting the mixture with a basic catalyst consisting essentially of an alkali metal.

6. The method which comprises heating, at a temperature of over 100° C. and below 200° C., an alkanedione of the formula

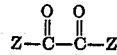

in which Z is an alkyl radical of from 1 to 8 carbon atoms with a phosphinate of the formula

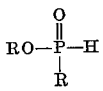

in which R is a hydrocarbon radical which is free of aliphatic unsaturation and contains from 1 to 12 carbon atoms to obtain a mixture of a hydroxy oxo phosphinate of the formula

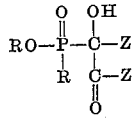

in which R and Z are as herein defined and an oxo phosphonate of the formula

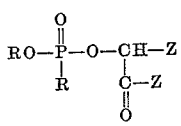

in which R and Z are as herein defined, and converting said hydroxy oxo phosphinate content of said mixture into said oxo phosphonate by contacting the mixture with a basic catalyst consisting essentially of an alkali metal hydride.

7. The method which comprises heating, at a temperature of over 100° C. and below 200° C., an alkanedione of the formula

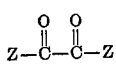

in which Z is an alkyl radical of from 1 to 8 carbon atoms with a phosphinate of the formula

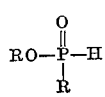

in which R is a hydrocarbon radical which is free of aliphatic unsaturation and contains from 1 to 12 carbon atoms to obtain a mixture of a hydroxy oxo phosphinate of the formula

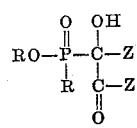

in which R and Z are as herein defined and an oxo phosphonate of the formula

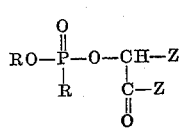

in which R and Z are as herein defined, and converting said hydroxy oxo phosphinate content of said mixture into said oxo phosphonate by contacting the mixture with a basic catalyst consisting essentially of an alkali metal alcoholate.

8. The method which comprises heating, at a temperature of over 100° C. and below 200° C., an alkanedione of the formula

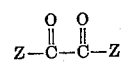

in which Z is an alkyl radical of from 1 to 8 carbon atoms with a bis(haloalkyl) phosphonate having from 1 to 12 carbon atoms in the haloalkyl radical, to obtain a mixture of a hydroxy oxo phosphonate of the formula

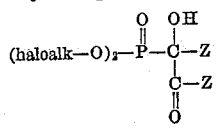

in which haloalk denotes a haloalkyl radical of from 1 to 12 carbon atoms and Z is as herein defined, and an oxo phosphate of the formula

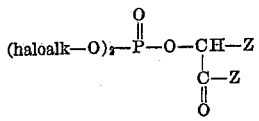

in which haloalk is defined above and Z is defined above, and converting said hydroxy oxo phosphonate content of said mixture into said oxo phosphate by contacting the mixture with a basic catalyst consisting essentially of an alkali metal.

9. The method which comprises heating, at a temperature of over 100° C. and below 200° C., an alkanedione of the formula

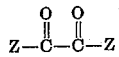

in which Z is an alkyl radical of from 1 to 8 carbon atoms with a bis(haloalkyl) phosphonate having from 1 to 12 carbon atoms in the haloalkyl radical, to obtain a mixture of a hydroxy oxo phosphonate of the formula

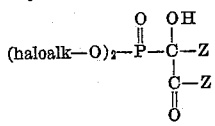

in which haloalk denotes a haloalkyl radical of from 1 to 12 carbon atoms and Z is as herein defined, and an oxo phosphate of the formula

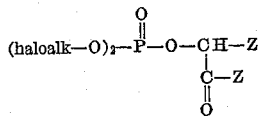

in which haloalk and Z are as herein defined, and converting said hydroxy oxo phosphonate content of said mixture into said oxo phosphate by contacting the mixture with a basic catalyst consisting essentially of an alkali metal hydride.

10. The method which comprises heating, at a temperature of over 100° C. and below 200° C., an alkanedione of the formula

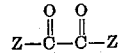

in which Z is an alkyl radical of from 1 to 8 carbon atoms with a bis(haloalkyl) phosphonate having from 1 to 12 carbon atoms in the haloalkyl radical, to obtain a mixture of a hydroxy oxo phosphonate of the formula

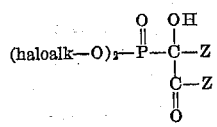

in which haloalkyl denotes a haloalkyl radical of from 1 to 12 carbon atoms and Z is as herein defined, and an oxo phosphate of the formula

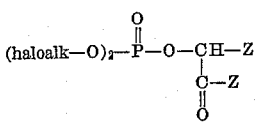

in which haloalk and Z are as herein defined, and converting said hydroxy oxo phosphonate content of said mixture into said oxo phosphate by contacting the mixture with a basic catalyst consisting essentially of an alkali metal alcoholate.

11. The method of preparing an oxo ester of a phosphorus acid of the formula

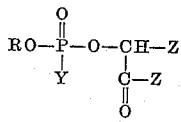

wherein R is selected from the class consisting of hydrocarbon and halohydrocarbon radicals which have from 1 to 12 carbon atoms and are free of aliphatic unsaturation, Y is selected from the class consisting of R and —OR and Z is an alkyl radical of from 1 to 8 carbon atoms, which comprises contacting a hydroxy ester of the formula

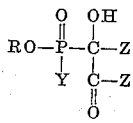

wherein R, Y and Z are as herein defined, with a basic catalyst selected from the class consisting of alkali metals and the hydrides, oxides, hydroxides and alcoholates thereof.

12. The method of preparing an oxo phosphate of the formula

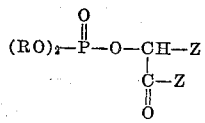

in which R is a hydrocarbon radical which is free of aliphatic unsaturation and which contains from 1 to 12 carbon atoms which comprises contacting a hydroxy oxo phosphonate of the formula

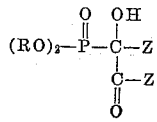

where R and Z are as herein defined, with a basic catalyst selected from the class consisting of alkali metals and the hydrides, oxides, hydroxides and alcoholates thereof.

13. The method of preparing an oxo phosphonate of the formula

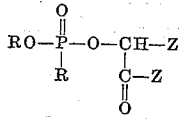

wherein R is a hydrocarbon radical which is free of aliphatic unsaturation and contains from 1 to 12 carbon atoms which comprises contacting a hydroxy oxo phosphinate of the formula

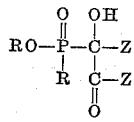

wherein R and Z are as herein defined, with a basic catalyst selected from the class consisting of alkali metals and the hydrides, oxides, hydroxides and alcoholates thereof.

14. The method of preparing an oxo phosphate of the formula

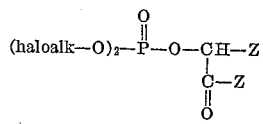

in which haloalk denotes a haloalkyl radical of from 1 to 12 carbon atoms which comprises contacting a hydroxy oxo phosphonate of the formula

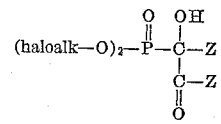

wherein haloalk and Z are as herein defined, with a basic catalyst selected from the class consisting of alkali metals and the hydrides, oxides, hydroxides and alcoholates thereof.

15. The method which comprises heating 2,3-butanedione with diethyl phosphonate at a temperature of over 100° C. and below 200° C. to obtain a mixture of (I) diethyl 1-hydroxy-1-methyl - 2-oxopropylphosphonate and (II) diethyl 1-methyl-2-oxopropyl phosphate and converting the (I) content of said mixture into (II) by contacting the mixture with a basic catalyst consisting essentially of metallic sodium.

16. The method of preparing diethyl 1-methyl-2-oxopropyl phosphate which comprises contacting diethyl 1-hydroxy-1-methyl-2-oxopropylphosphonate with a basic catalyst consisting essentially of metallic sodium.

17. The method which comprises heating 2,3-butanedione with bis(2-chloroethyl) phosphonate at a temperature of over 100° C. and below 200° C. to obtain a mixture of (I) bis(2-chloroethyl) 1-hydroxy-1-methyl-2- oxopropylphosphonate and (II) bis(2-chloroethyl) 1-methyl-2-oxopropyl phosphate and converting the (I) content of said mixture into (II) by contacting the mixture with a basic catalyst consisting essentially of metallic sodium.

18. The method which comprises heating 2,3-butanedione with bis(2-ethylhexyl) phosphonate at a temperature of over 100° C. and below 200° C. to obtain a mixture of (I) bis(2-ethylhexyl) 1-hydroxy-1-methyl-2-oxopropylphosphonate and (II) bis(2-ethyl hexyl) 1-methyl-2-oxopropyl phosphate and converting the (I) content of said mixture into (II) by contacting the mixture with a basic catalyst consisting essentially of sodium hydride.

19. The method which comprises heating 2,3-butanedione with ethyl phenylphosphinate at a temperature of over 100° C. but below 200° C. to obtain a mixture of (I) ethyl 1-hydroxy-1-methyl - 2-oxopropyl phenylphosphinate and (II) ethyl 1-methyl-2-oxopropyl phenylphosphonate, and converting the (I) content of said mixture into (II) by contacting the mixture with a basic catalyst consisting essentially of metallic sodium.

References Cited in the file of this patent
UNITED STATES PATENTS

| | | |
|---|---|---|
| 2,230,120 | Paist | Jan. 28, 1941 |
| 2,579,810 | Fields | Dec. 25, 1951 |
| 2,612,513 | Gluesenkamp | Sept. 30, 1952 |

OTHER REFERENCES

Chemical Abstracts, vol 52, page 8941 (1958), article by Abramov et al.

Chemical Abstracts, vol 52, page 7125d (1958), article by Abramov et al.